(12) United States Patent
Yoshimoto et al.

(10) Patent No.: US 10,810,959 B2
(45) Date of Patent: Oct. 20, 2020

(54) DISPLAY DEVICE

(71) Applicant: SHARP KABUSHIKI KAISHA, Sakai, Osaka (JP)

(72) Inventors: Kazuhisa Yoshimoto, Osaka (JP); Kohji Saitoh, Osaka (JP); Yasuki Mori, Osaka (JP); Masaki Uehata, Osaka (JP); Kazuya Kondoh, Osaka (JP); Kosuke Kawamoto, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/626,511

(22) PCT Filed: Jun. 28, 2018

(86) PCT No.: PCT/JP2018/024490
§ 371 (c)(1),
(2) Date: Dec. 24, 2019

(87) PCT Pub. No.: WO2019/004330
PCT Pub. Date: Jan. 3, 2019

(65) Prior Publication Data
US 2020/0286437 A1 Sep. 10, 2020

(30) Foreign Application Priority Data
Jun. 30, 2017 (JP) .................. 2017-128435

(51) Int. Cl.
*G09G 3/36* (2006.01)
(52) U.S. Cl.
CPC ... *G09G 3/3648* (2013.01); *G09G 2300/0871* (2013.01)

(58) Field of Classification Search
CPC .. G09G 3/3266; G09G 3/3275; G09G 3/3274; G09G 3/3677; G09G 3/3681;
(Continued)

(56) References Cited

U.S. PATENT DOCUMENTS 6,529,179 B1 * 3/2003 Hashimoto ....... G02F 1/133615
345/102
2008/0297443 A1 * 12/2008 Arima .................. H05K 5/02
345/60

(Continued)

FOREIGN PATENT DOCUMENTS

| JP | 2003-280541 A | 10/2003 |
|---|---|---|
| JP | 2005-043641 A | 2/2005 |
| JP | 2010-139770 A | 6/2010 |

*Primary Examiner* — Dong Hui Liang
(74) *Attorney, Agent, or Firm* — ScienBiziP, P.C.

(57) ABSTRACT

A display device includes a display panel having a display surface, display drivers arranged on and along a peripheral portion of the display panel, a wiring substrate located on a side of the display panel opposite from the display surface and having a long shape extending in an arrangement direction of the display drivers, first flexible wiring substrates electrically connecting the display drivers to the wiring substrate, a second flexible wiring substrate extending from the wiring substrate toward an outer periphery of the display panel, and a control board connected to an extended end portion of the second flexible wiring substrate and configured to control the display drivers and disposed not to overlap the display panel in a thickness direction of the display panel and having a dimension in the thickness direction of the display panel larger than that of the wiring substrate.

6 Claims, 6 Drawing Sheets

(58) Field of Classification Search
CPC .. G09G 3/3685; G09G 3/3688; G09G 3/3692; G09G 2310/0264; G09G 2310/0267; G09G 2310/027; G09G 2310/0272; G09G 2310/0275; G09G 2310/0278; G09G 2310/0281
See application file for complete search history.

(56) References Cited

U.S. PATENT DOCUMENTS

2010/0259563 A1* 10/2010 Tokuda ................ G09G 3/3258
345/690
2011/0242039 A1* 10/2011 Kalis .................... G06F 1/1643
345/174

* cited by examiner

FIG.6

DISPLAY DEVICE

TECHNICAL FIELD

The present invention relates to a display device.

BACKGROUND ART

A known example of a display device includes substrates electrically connected to a display panel (liquid crystal panel) (Patent Document 1 below). In Patent Document 1, the display device includes substrates on and outside a display panel.

RELATED ART DOCUMENT

Patent Document

Patent Document 1: Japanese Unexamined Patent Application Publication No. 2010-139770

Problem to be Solved by the Invention

In the above-described configuration, the substrate disposed on the display panel increases the overall thickness of the display device by the thickness of the substrate. Furthermore, the substrate disposed outside the display panel increases the overall size of the display device by the size of the substrate.

DISCLOSURE OF THE PRESENT INVENTION

The present invention was made in view of the above-described circumstances, and an object thereof is to provide a display device having a smaller size and a smaller thickness.

Means for Solving the Problem

To solve the above-described problem, a display device according to the present invention includes a display panel having a display surface on which an image is displayed, display drivers arranged on and along a peripheral portion of the display panel and configured to drive the display panel and display an image, a wiring substrate located on a side of the display panel opposite from the display surface and having a long shape extending in an arrangement direction of the display drivers, first flexible wiring substrates electrically connecting the display drivers to the wiring substrate, a second flexible wiring substrate extending from the wiring substrate toward an outer periphery of the display panel, and a control board connected to an extended end portion of the second flexible wiring substrate and configured to control the display drivers. The control board is disposed not to overlap the display panel in a thickness direction of the display panel and has a dimension in the thickness direction of the display panel larger than that of the wiring substrate.

In the above-described configuration, the display drivers are each controlled by a signal sent from the control board through the second flexible wiring substrate, the wiring substrate, and the first flexible wiring substrate. Furthermore, the display device of this configuration has a smaller size in a plane direction than that of a configuration in which the wiring substrate is positioned next to the display panel in the plane direction of the display surface, because the wiring substrate is positioned on a side opposite the display surface.

Furthermore, if the control board, which is larger than the wiring substrate in the thickness direction of the display panel, and the display panel are stacked on each other in the thickness direction, the display device would have a larger thickness. The increase in thickness of the display device is reduced by placing only the wiring substrate having a relatively small thickness on the side opposite the display surface.

Advantageous Effect of the Invention

The present invention provides a display device having a smaller size and a smaller thickness.

MODES FOR CARRYING OUT THE INVENTION

Figure 3:
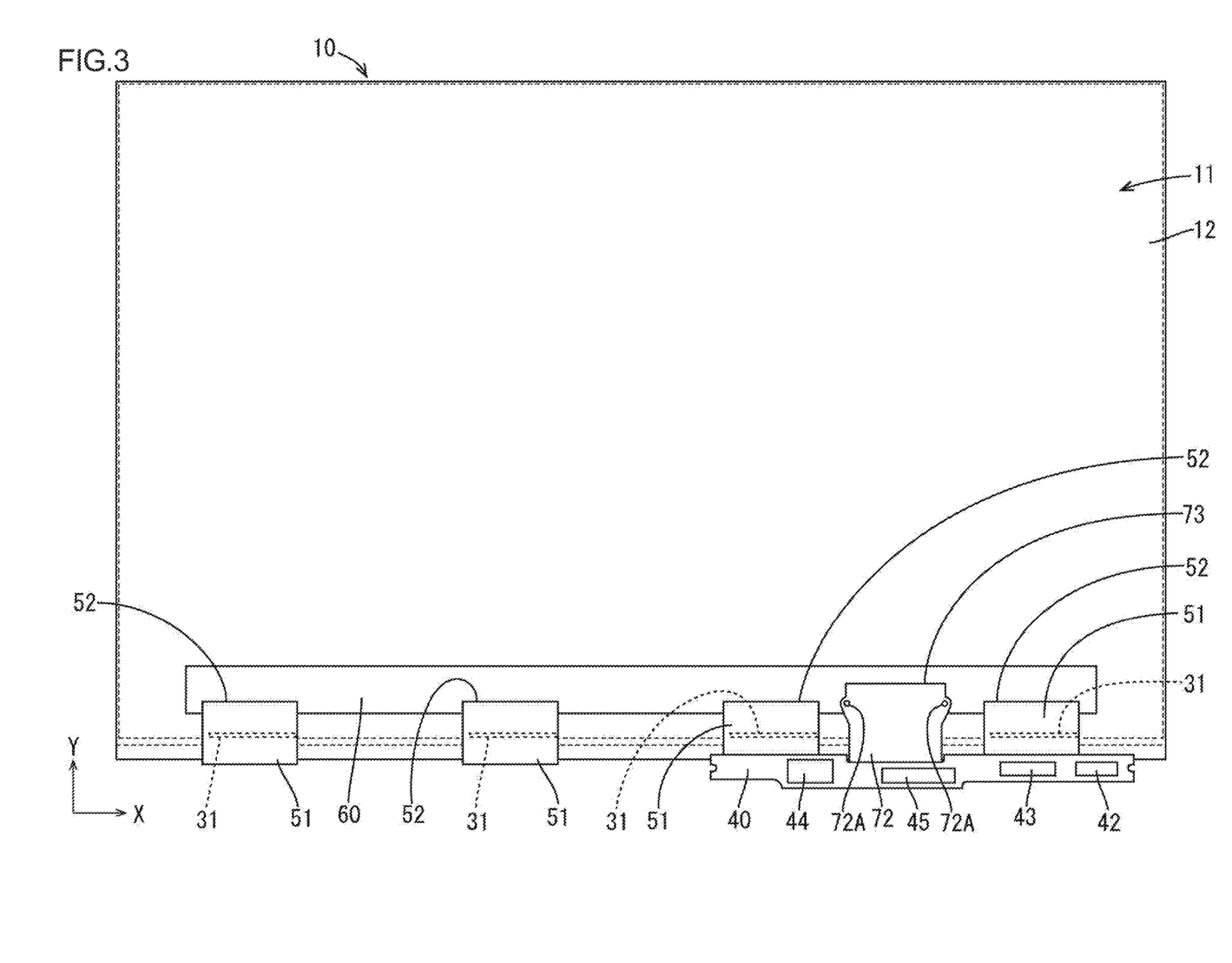
FIG. 3 is a rear view (viewed from the side of the backlight device) illustrating the liquid crystal display device.
Figure 4:
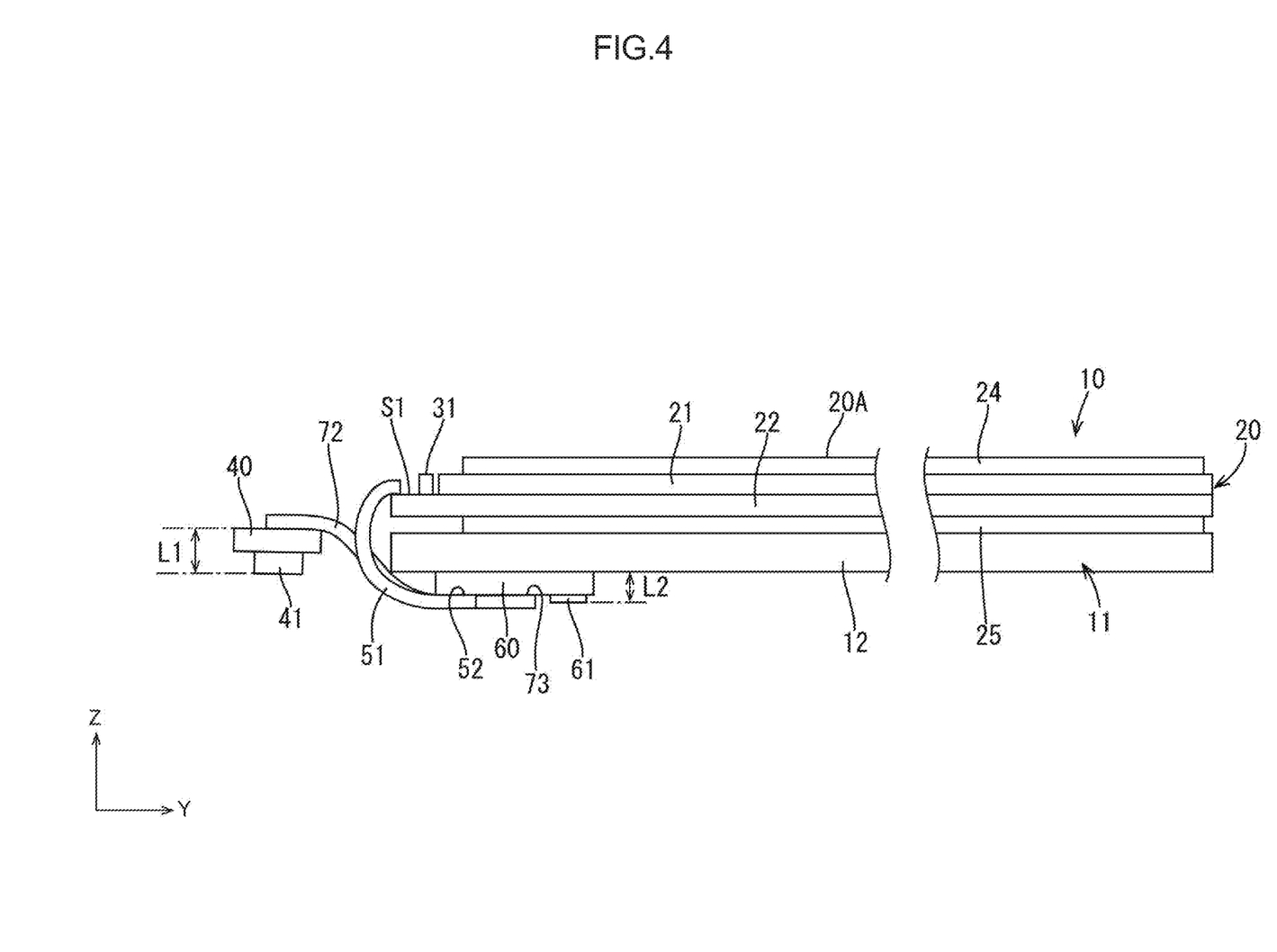
FIG. 4 is aside view illustrating the liquid crystal display device.

An embodiment of the invention is described with reference to FIGS. 1 to 6. The X axis, the Y axis, and the Z axis are indicated in some of the drawings, and each of the axes indicates the same direction in the respective drawings. As illustrated in FIGS. 1 to 4, a liquid crystal display device 10 (display device) includes a liquid crystal panel 20 (display panel) and a backlight device 11 (lighting device), which is an external light source for applying light to the liquid crystal panel 20. As illustrated in FIG. 4, the backlight device 11 includes a chassis 12 positioned on the rear side of the liquid crystal panel 20 and a light source (not illustrated) (such as a cold-cathode tube, an LED, and an organic EL) in the chassis 12.

The liquid crystal display device 10 of the embodiment is used in various electronic devices, such as a laptop computer (including a tablet computer) and a mobile information terminal (including an electronic book reader and PDA). The screen size of the liquid crystal panel 20 in the liquid crystal display device 10 is, for example, 10.6 inches or more, but the screen size is not limited to this. The liquid crystal display device 10 used in landscape orientation is described as an example, but the orientation of the liquid crystal display device is not limited to this.

Figure 1:
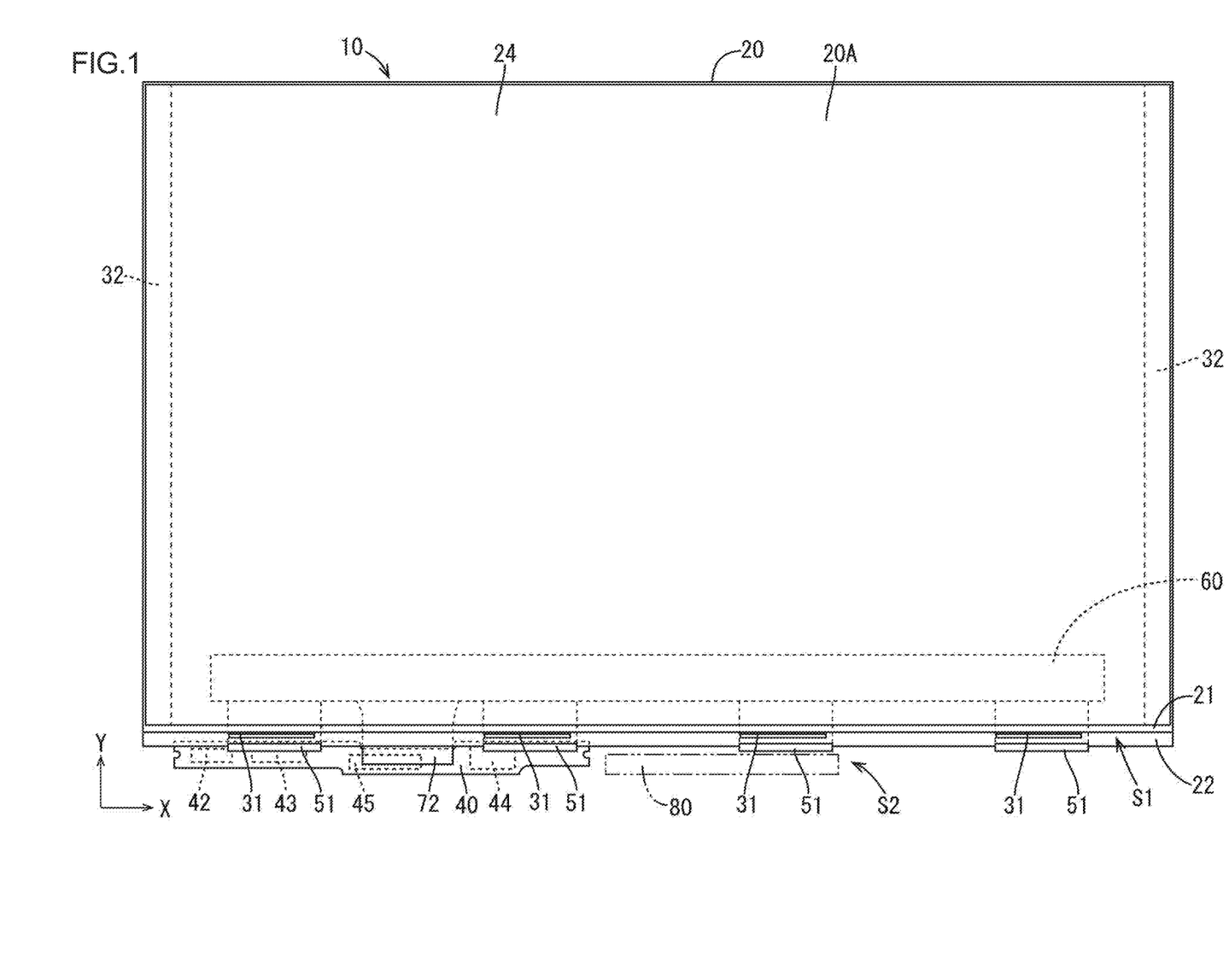
FIG. 1 is a front view (viewed from the side of the display surface) illustrating a liquid crystal display device according to an embodiment of the invention.

The liquid crystal panel 20 has a horizontally long rectangular (quadrilateral) overall shape as illustrated in FIG. 1 and has a display surface 20A on which an image is displayed. As illustrated in FIG. 4, the liquid crystal panel 20 includes two substrates 21 and 22 facing each other and a liquid crystal layer (not illustrated) located between the substrates 21 and 22 and containing liquid crystal molecules whose optical properties are changed by application of an electrical field. One of the substrates 21 and 22 on the front side (upper side in FIG. 4) is a counter substrate 21 and the other on the rear side (rear surface side) is an array substrate 22 (active matrix substrate, element substrate). The counter substrate 21 and the array substrate 22 each include a glass substrate formed of glass and various films layered on the inner surface of the glass substrate. Polarizing plates 24 and 25 are attached to the outer surfaces of the substrates 21 and 22.

As illustrated in FIG. 1, the array substrate 22 has a non-overlapping area S1 not having the overlapping counter substrate 21 at one peripheral end in the short-side direction. The non-overlapping area S1 (peripheral end of the display panel) is long in the X axis direction. In the non-overlapping area S1, multiple (four in this embodiment) source drivers 31 (display drivers) are mounted. The source drivers 31 have long sides extending in the X axis direction and are arranged in the X axis direction in a straight line. The glass substrate of the array substrate 22 has gate drivers 32 (indicated by broken lines in FIG. 1) on the end portions in the X axis direction. The gate drivers 32 are each long in the Y axis direction and formed in a monolithic form on the glass substrate of the array substrate 22.

Furthermore, source bus lines (not illustrated) on the glass substrate of the array substrate 22 are connected to the source drivers 31. Gate bus lines (not illustrated) on the glass substrate of the array substrate 22 are connected to the gate drivers 32. Furthermore, TFTs (not illustrated) as switching elements are disposed on the glass substrate of the array substrate 22 at intersections of the source bus lines and the gate bus lines. In this embodiment, the gate drivers 32 are positioned on the end portions in the X axis direction, but the position of the gate drivers 32 is not limited to this. For example, the gate drivers 32 may be positioned on only one end portion in the X axis direction.

As illustrated in FIG. 1, multiple (four in this embodiment) flexible wiring substrates 51 (first flexible wiring substrates) are disposed in the non-overlapping area S1 of the array substrate 22. The flexible wiring substrates 51 are located at positions corresponding to the source drivers 31. The flexible wiring substrates 51 are each electrically connected to the gate driver 32 and the source driver 31 at one end through a wiring pattern (not illustrated) on the array substrate 22. As illustrated in FIG. 3, the flexible wiring substrates 51 are each connected to the wiring substrate 60 at the other end. The wiring substrate 60 is long in the X axis direction (arrangement direction of the source drivers 31 in which the source drivers 31 are arranged) and is attached to the rear surface of the backlight device 11 as illustrated in FIGS. 3 and 4. The wiring substrate 60 is positioned on the side of the liquid crystal panel 20 opposite the display surface 20A. In this configuration, the flexible wiring substrate 51 on the front side (upper side in FIG. 4) of the liquid crystal panel 20 has been folded down to the rear side (lower side in FIG. 4).

As illustrated in FIG. 3, a flexible wiring substrate 72 (second flexible wiring substrate) is disposed on the wiring substrate 60 and extends from the wiring substrate 60 to the outer periphery of the liquid crystal panel 20 (lower side in FIG. 3). The flexible wiring substrates 51 and the flexible wiring substrate 72 are each flexible. Furthermore, the wiring substrate 60 is a rigid board, but may be a flexible board.

A control board 40 is connected to an extended end portion of the flexible wiring substrate 72 adjacent to the liquid crystal panel 20. As illustrated in FIG. 4, the control board 40 does not overlap the liquid crystal panel 20 in the thickness direction (Z axis direction) of the liquid crystal panel 20. The control board 40 is positioned next to the module including the liquid crystal panel 20 and the backlight device 11 in the Y axis direction (planar direction of the display surface 20A). The control board 40 is adjacent to one of the peripheral ends of the liquid crystal panel 20 that is located at one end in the short-side direction of the liquid crystal panel 20. The wiring substrate 60, the flexible wiring substrates 51, and the flexible wiring substrate 72 each have multiple wiring patterns (not illustrated). In this configuration, the source drivers 31 and the gate drivers 32 are each electrically connected to the control board 40 through the flexible wiring substrates 51, the wiring substrate 60, and the flexible wiring substrate 72.

Figure 5:
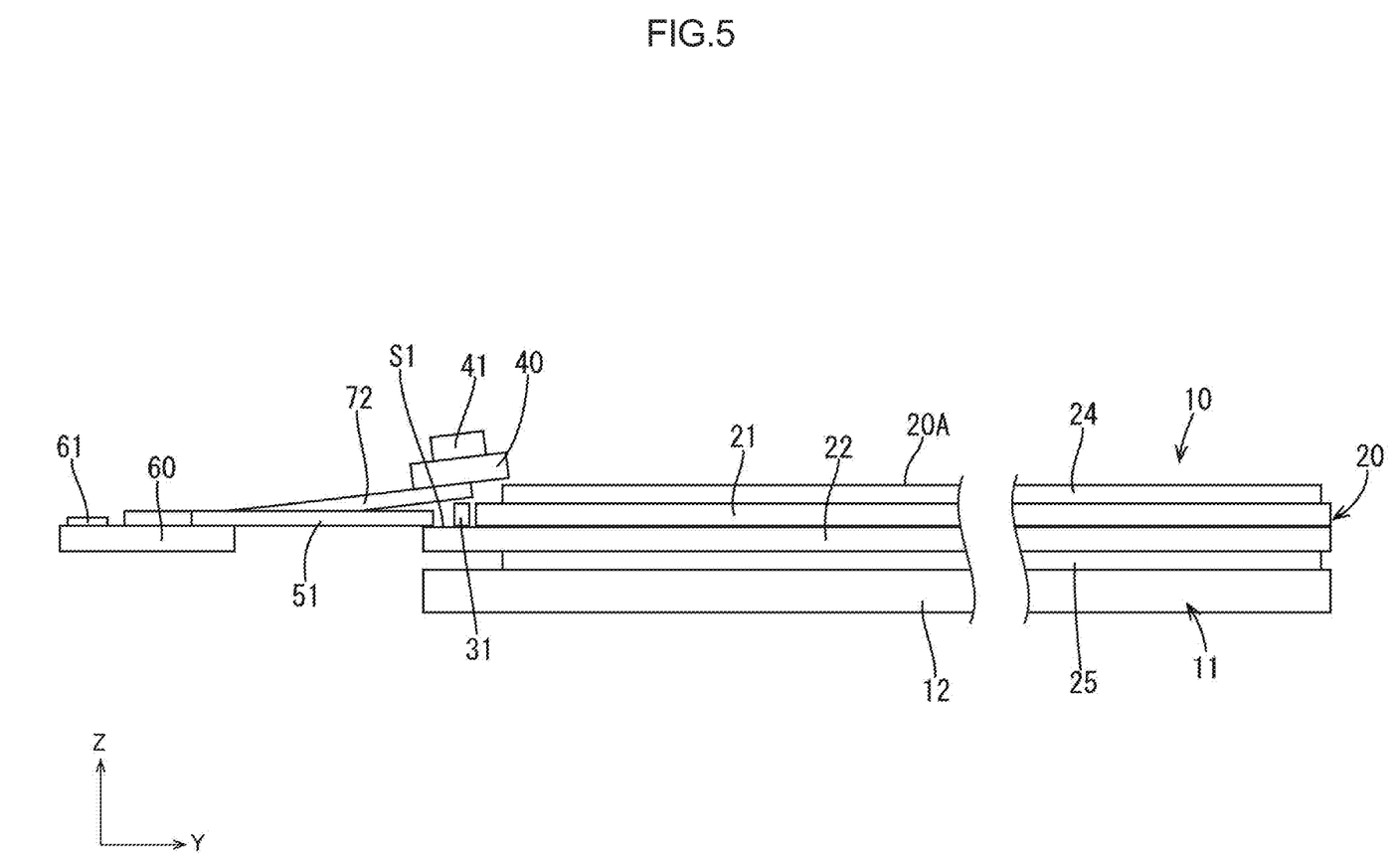
FIG. 5 is a side view illustrating the liquid crystal display device in which the wiring substrate is in an unfolded state.

The control board 40 controls driving of the source drivers 31 and the gate drivers 32 to drive the liquid crystal panel 20 and display an image on the display surface 20A. In this embodiment, as illustrated in FIG. 5, the flexible wiring substrates 51, the wiring substrate 60, the flexible wiring substrate 72, and the control board 40 are attached to the liquid crystal panel 20 while being in an unfolded state (in which the flexible wiring substrates 51 extend outward from the liquid crystal panel 20). Then, as illustrated in FIG. 4, the wiring substrate 60 is brought close to the backlight device 11 and fixed to the rear surface of the backlight device 11. In the unfolded state illustrated in FIG. 5, the flexible wiring substrate 72 extends from the wiring substrate 60 toward the liquid crystal panel 20, and the control board 40 overlaps, for example, the peripheral end portion (non-overlapping area S1) of the liquid crystal panel 20.

As illustrated in FIG. 3, the control board 40 includes a power circuit 42, a level shifter circuit 43, a timing controller 44, and an interface connector 45. The power circuit 42 generates, based on the power voltage applied by an external device, a gate-on potential, which puts the gate bus line (not illustrated) connected to the gate driver 32 into a selected state, and a gate-off potential, which puts the gate bus line into an unselected state. The timing controller 44 receives a timing signal, such as a horizontal synchronization signal, a vertical synchronization signal, and a data enable signal, an image signal, and a power voltage, and generates a digital video signal, a source start pulse signal, a source clock signal, agate start pulse signal, and a gate clock signal. The digital video signal, the source start pulse signal, and the source clock signal are output to the source driver 31. The gate start pulse signal and the gate clock signal are output to the level shifter circuit 43.

The level shifter circuit 43 (level shift circuit) generates a signal in response to the signal from the power circuit 42 and outputs the signal to the gate drivers 32. As illustrated in FIG. 3, the level shifter circuit 43 on the control board 40 is located closer than the power circuit 42 to the flexile wiring substrate 72. For example, the level shifter circuit 43 has a function of converting a low-voltage signal to a high-voltage signal. The level shifter circuit 43 generates signals for activating the gate drivers 32 in response to the gate-on potential, the gate-off potential, and the various signals from the timing controller 44. The signals generated by the level shifter circuit 43 includes a gate start pulse signal, a gate clock signal, a clear signal, and a reference potential. The gate driver 32 in a monolithic form is called "GDM" in some cases. The signal generated by the level shifter circuit 43 and output to the gate driver 32 is called a "GDM signal" in some cases.

Furthermore, an example of a mounted component 41 (second mounted component, see FIG. 4) is a coil. The mounted component 41 is one of the mounted components of the circuits of the control board 40 that has a larger dimension in the Z axis direction than the other mounted components. The dimension of the coil in the Z axis direction (thickness direction of the display panel) is, for example, 1.2 mm. In contrast, an example of a mounted component 61 (first mounted component, see FIG. 4) is a capacitor used as a bypass capacitor. The mounted component 61 is one of the mounted components of the wiring substrate 60 that has a larger dimension in the Z axis direction than the other mounted components. The dimension of the capacitor in the Z axis direction is, for example, 0.33 mm. The height of the mounted component 61 included in the wiring substrate 60 is half or less than half the height of the mounted component 41 included in the control board 40. Furthermore, the dimension L1 of the control board 40 in the Z axis direction is larger than the dimension L2 of the wiring substrate 60. The dimension of the board or the substrate include the dimension of the mounted component.

Figure 2:
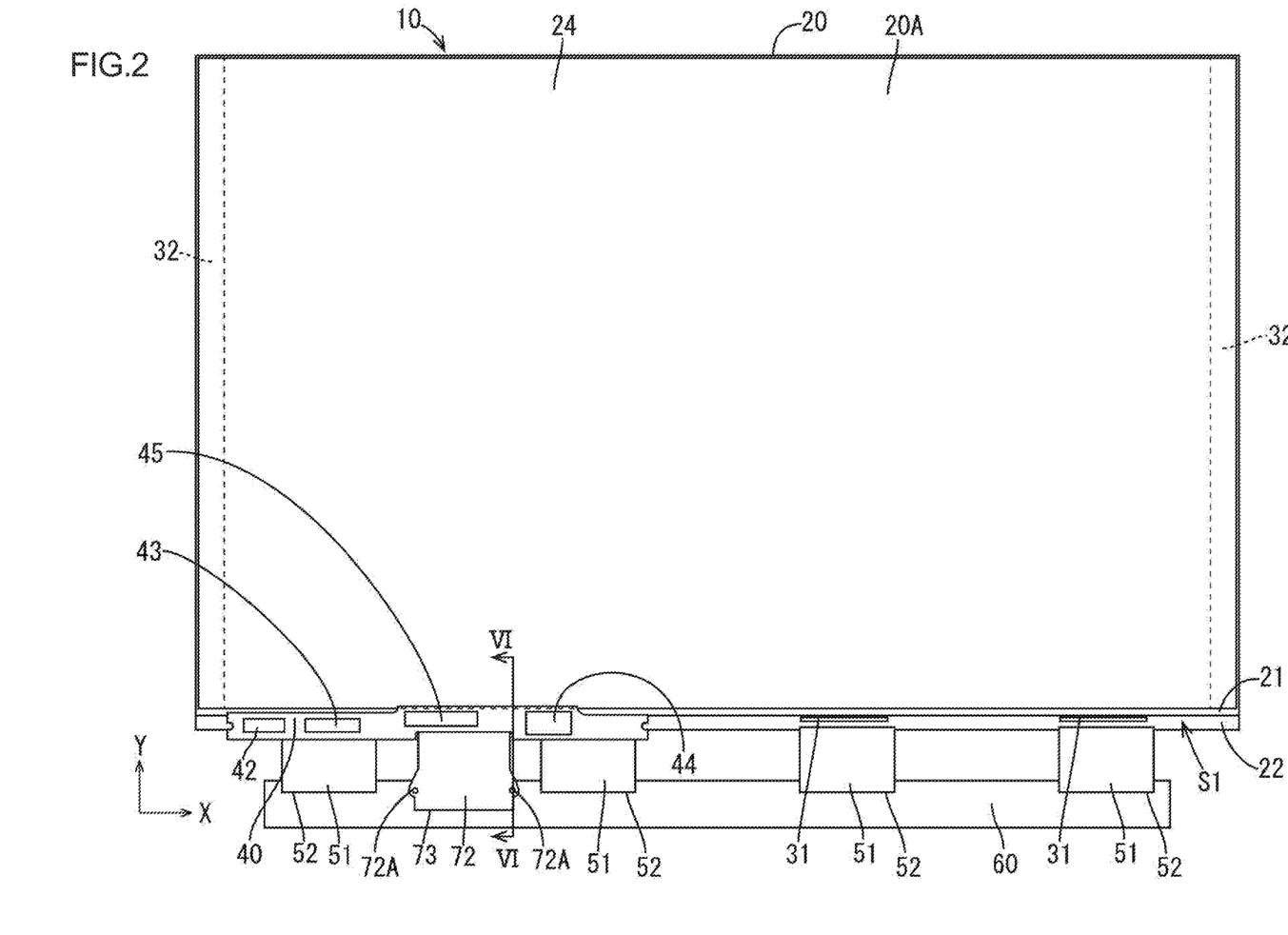
FIG. 2 is a front view illustrating the liquid crystal display device in which a wiring substrate is in an unfolded state.

Furthermore, as illustrated in FIG. 2, connecting points 52 between the flexible wiring substrates 51 and the wiring substrate 60 are arranged in the longitudinal direction of the wiring substrate 60, and a connecting point 73 between the flexible wiring substrate 72 and the wiring substrate 60 is located away from the connecting points 52 between the flexible wiring substrates 51 and the wiring substrate 60 in the Y axis direction (short-side direction of the wiring substrate 60) toward a side away from the flexible wiring substrates 51. Although not illustrated, terminals of the flexible wiring substrates 51 and terminals of the wiring substrate 60 are connected to each other at the connecting points 52 via an anisotropic conductive film, and a terminal of the flexible wiring substrate 72 and a terminal of the wiring substrate 60 are connected at the connecting point 73 via an anisotropic conductive film.

Figure 6:
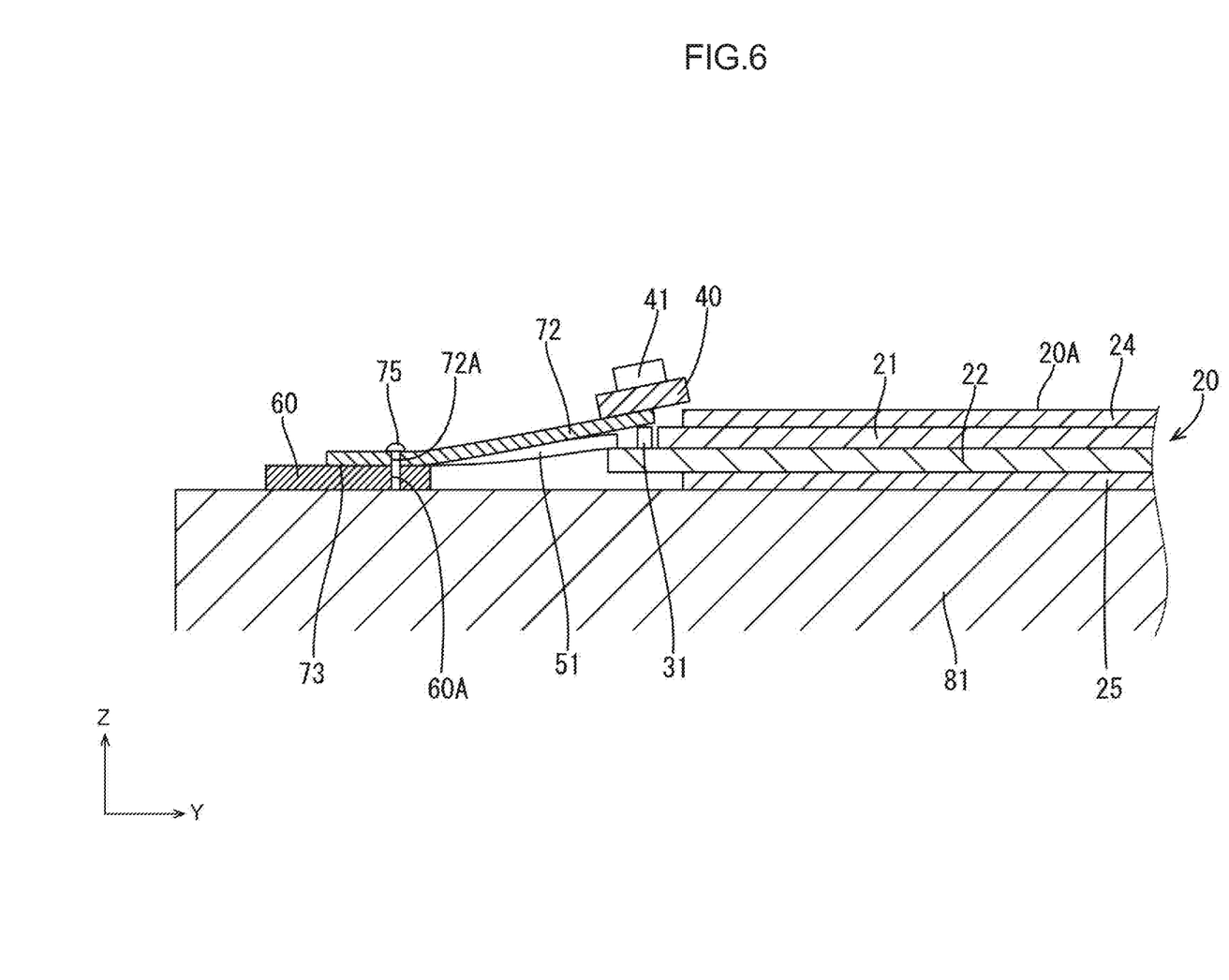
FIG. 6 is a cross-sectional view (taken along line VI-VI in FIG. 2) illustrating a step of connecting a flexible wiring substrate to the wiring substrate.

FIG. 2 illustrates the wiring substrate 60 before being positioned on the rear surface of the backlight device 11. As illustrated in FIG. 3, the flexible wiring substrate 72 has two through holes 72A (first through holes) at ends in the width direction. As illustrated in FIG. 6, the through holes 72A are positioned in an area of the flexible wiring substrate 72 that overlaps the wiring substrate 60, and the wiring substrate 60 has through holes 60A (second through holes) in communication with the through holes 72A.

As illustrated in FIG. 6, the flexible wiring substrate 72 is connected to the wiring substrate 60 while the flexible wiring substrate 51 is in an unfolded state (in which the flexible wiring substrate 51 extends outward from the liquid crystal panel 20). Positioning pins 75 are inserted into the through holes 60A and 72A, and then the flexible wiring substrate 72 is connected to the wiring substrate 60. The connection is made while the position of the flexible wiring substrate 72 relative to the wiring substrate 60 is fixed. In this embodiment, thermal compression bonding is performed to connect the substrates and to connect the flexible wiring substrates 51 and the array substrate 22 with an anisotropic conductive film (not illustrated) therebetween. However, the connection method is not limited to this.

As illustrated in FIG. 1, the control board 40 is long in the X axis direction and the length is smaller than the length of the liquid crystal panel 20. Thus, there is a space S2 next to the control board 40 in the X axis direction. As indicated by a two-dot chain line in FIG. 1, a functional component 80 may be disposed in the space S2. A non-limiting example of the functional component 80 is a camera module. Furthermore, the liquid crystal panel 20 may include a touch panel. In such a case, the functional component 80 may be a circuit board for controlling the touch panel.

Next, effects of the embodiment are described. In this embodiment, the source drivers 31 are each controlled by a signal sent from the control board 40 through the flexible wiring substrate 72, the wiring substrate 60, and the flexible wiring substrate 51. Furthermore, the wiring substrate 60 is positioned on a side opposite the display surface 20A, and thus the liquid crystal display device 10 has a smaller size in the plane direction than a liquid crystal display device in which the wiring substrate 60 is positioned next to the liquid crystal panel 20 in the plane direction of the display surface 20A. Furthermore, if the control board 40, which is larger than the wiring substrate 60 in the thickness direction of the liquid crystal panel 20, and the liquid crystal panel 20 are stacked on each other in the thickness direction, the liquid crystal display device 10 would have a larger thickness. The increase in thickness of the liquid crystal display device 10 is reduced by placing only the wiring substrate 60 having a relatively small thickness on the side opposite the display surface 20A.

Furthermore, the flexible wiring substrate 72 has the through holes 72A in an area overlapping the wiring substrate 60, and the wiring substrate 60 has the through holes 60A in communication with the through holes 72A. The position of the flexible wiring substrate 72 relative to the wiring substrate 60 is fixed by inserting the positioning pins 75 into the through holes 72A and the through holes 60A. Thus, the connection between the wiring substrate 60 and the flexible wiring substrate 72 is more reliably performed.

As illustrated in FIG. 6, the flexible wiring substrate 72 is connected to the wiring substrate 60 with the control board 40 being connected to the flexible wiring substrate 72. The control board 40 is positioned above the liquid crystal panel 20 and cannot be fixed onto a support 81. This configuration cannot employ common positioning using an alignment mark. To solve the problem, the present embodiment uses the positioning pins 75 that enable positioning of the flexible wiring substrate 72 although the control board 40 is not fixed.

Furthermore, the connecting points 52 between the flexible wiring substrates 51 and the wiring substrate 60 are arranged in the longitudinal direction of the wiring substrate 60. The connecting point 73 between the flexible wiring substrate 72 and the wiring substrate 60 is located away from the connecting points 52 between the flexible wiring substrates 51 and the wiring substrate 60 in the short-side direction of the wiring substrate 60 toward a side away from the flexible wiring substrate 51. The position of the connecting point 73 between the flexible wiring substrate 72 and the wiring substrate 60 or the position of the control board 40 is readily changed in the longitudinal direction of the wiring substrate 60. A space may be left next to the control board 40 in the longitudinal direction such that a functional component is disposed in the space.

Furthermore, the liquid crystal panel 20 includes the gate drivers 32 electrically connected to the control board 40 through the flexible wiring substrate 72, the wiring substrate 60, and the flexible wiring substrates 51. The control board 40 includes at least the power circuit 42 and the level shifter circuit 43 configured to generate a signal in response to a signal from the power circuit 42 and output the signal to the gate driver 32. The level shifter circuit 43 of the control board 40 is located closer than the power circuit 42 to the flexible wiring substrate 72. This configuration shortens the wiring route between the power circuit 42, the level shifter circuit 43, and the flexible wiring substrate 72, leading to a further reduction in signal transmission loss.

Furthermore, the dimension of the mounted component 61 included in the wiring substrate 60 in the Z axis direction is half or less than half the dimension of the mounted component 41 included in the control board 40 in the Z axis direction. This configuration does not increase the thickness of the liquid crystal display device 10 compared with a configuration in which the control board 40 is positioned on a side opposite the display surface 20A.

Furthermore, the functional component 80 is disposed in the space next to the control board 40 in the longitudinal direction of the wiring substrate 60. In this configuration, the control board 40 and the functional component 80 are positioned next to each other in the longitudinal direction of the wiring substrate 60, because there is no need to position the wiring substrate 60 next to the control board 40. Thus, the liquid crystal display device 10 saves space.

Other Embodiments

The present invention is not limited to the embodiments described above and illustrated by the drawings. For example, the following embodiments will be included in the technical scope of the present invention.

(1) In the above-described embodiment, the liquid crystal display device includes the liquid crystal panel as a display panel. However, the technology described herein is applicable to a display device including another type of display panel.

(2) In the above-described embodiment, two or more of the substrates may be included in a single substrate. For example, a single substrate (rigid flexible substrate) may include the control board 40 and the flexible wiring substrate 72.

(3) In the above-described embodiment, the mounted component 41 is a coil and the mounted component 61 is a capacitor, but the mounted components 41 and 61 are not limited to these examples. The mounted components 41 and 61 may be other components.

EXPLANATION OF SYMBOLS

10: liquid crystal display device (display device)
20: liquid crystal panel (display panel)
20A: display surface
31: source driver (display driver)
32: gate driver
40: control board
41: mounted component (mounted second component)
42: power circuit
43: level shifter circuit
51: flexible wiring substrate (first flexible wiring substrate)
52: connecting point (connecting point between the first flexible wiring substrate and the wiring substrate)
60: wiring substrate
60A: through hole (second through hole)
61: mounted component (first mounted component)
72: flexible wiring substrate (second flexible wiring substrate)
72A: through hole (first through hole)
73: connecting point (connecting point between the second flexible wiring substrate and the wiring substrate)
80: functional component

The invention claimed is:

1. A display device comprising:
a display panel having a display surface on which an image is displayed;
display drivers arranged on and along a peripheral portion of the display panel and configured to drive the display panel and display an image;
a wiring substrate located on a side of the display panel opposite from the display surface and having a long shape extending in an arrangement direction of the display drivers;
first flexible wiring substrates electrically connecting the display drivers to the wiring substrate;
a second flexible wiring substrate extending from the wiring substrate toward an outer periphery of the display panel; and
a control board connected to an extended end portion of the second flexible wiring substrate and configured to control the display drivers, the control board being disposed not to overlap the display panel in a thickness direction of the display panel and having a dimension in the thickness direction of the display panel larger than that of the wiring substrate.

2. The display device according to claim 1, wherein the second flexible wiring substrate has a first through hole in an area overlapping the wiring substrate, and the wiring substrate has a second through hole in an area overlapping the first through hole.

3. The display device according to claim 1, wherein connecting points between the first flexible wiring substrates and the wiring substrate are arranged in a longitudinal direction of the wiring substrate, and
a connecting point between the second flexible wiring substrate and the wiring substrate is located away from the connecting points between the first flexible wiring substrates and the wiring substrate in a short-side direction of the wiring substrate toward a side away from the first flexible wiring substrate.

4. The display device according to claim 1, wherein the display panel includes a gate driver electrically connected to the control board via the first flexible wiring substrates, the wiring substrate, and the second flexible wiring substrate,
the control board includes a power circuit and a level shifter circuit configured to generate a signal in response to a signal from the power circuit and output the signal to the gate driver, and
the level shifter circuit of the control board is located closer than the power circuit to the second flexible wiring substrate.

5. The display device according to claim 1, wherein a first mounted component included in the wiring substrate has a dimension in the thickness direction that is half or less than half a dimension of a second mounted component included in the control board.

6. The display device according to claim 1, wherein a functional component is disposed in a space next to the control board in a longitudinal direction of the wiring substrate.

* * * * *